United States Patent [19]

Dumery

[11] Patent Number: 4,589,282

[45] Date of Patent: May 20, 1986

[54] FINE RESOLUTION LIQUID LEVEL DETECTOR

[75] Inventor: Stefaan D. Dumery, Shrewsbury, Mass.

[73] Assignee: Sprague Electric Company, North Adams, Mass.

[21] Appl. No.: 642,459

[22] Filed: Aug. 20, 1984

Related U.S. Application Data

[63] Continuation-in-part of Ser. No. 363,183, Mar. 29, 1982, Pat. No. 4,466,284.

[51] Int. Cl.[4] ............................................. G01F 23/38
[52] U.S. Cl. ................................. 73/313; 73/DIG. 3; 324/204; 324/251
[58] Field of Search .................. 73/308, 313, DIG. 3, 73/DIG. 5; 324/204; 340/620, 624, 625; 200/84 C

[56] References Cited

U.S. PATENT DOCUMENTS

| | | | |
|---|---|---|---|
| 3,419,798 | 12/1968 | Walton | 324/45 |
| 3,646,293 | 2/1972 | Howard | 200/84 C |
| 4,056,979 | 11/1977 | Bongort et al. | 73/313 |
| 4,084,436 | 4/1978 | Smitherman | 73/313 |
| 4,361,835 | 11/1982 | Nagy | 340/624 |
| 4,466,284 | 8/1984 | Dumery | 73/313 |

*Primary Examiner*—Charles Frankfort
*Assistant Examiner*—Thomas B. Will

[57] ABSTRACT

A large number of equally spaced Hall-sensors form a column. They are mounted in a tube with a closed bottom. Each sensor is a packaged integrated circuit with a Hall-cell connected to a Schmitt Trigger circuit. An annular float being fitted slidably about the tube carries a compound magnet that generates a pattern of regularly spaced apart magnetic field regions each having the same dimensions and each capable of switching an immediately adjacent Hall-sensor. The Hall-sensors are energized sequentially and one at one time. By counting the number of Hall-sensors scanned, from the beginning end of the column to the first Hall-sensor that is switched, a rough measure of the liquid level is obtained. The magnetic field regions are spaced apart by a distance that is not equal to the Hall-sensor spacing so that the pattern of Hall-sensor output voltages provides a unique vernier measure of the liquid level that is appropriately added to the afore-said rough measure.

2 Claims, 9 Drawing Figures

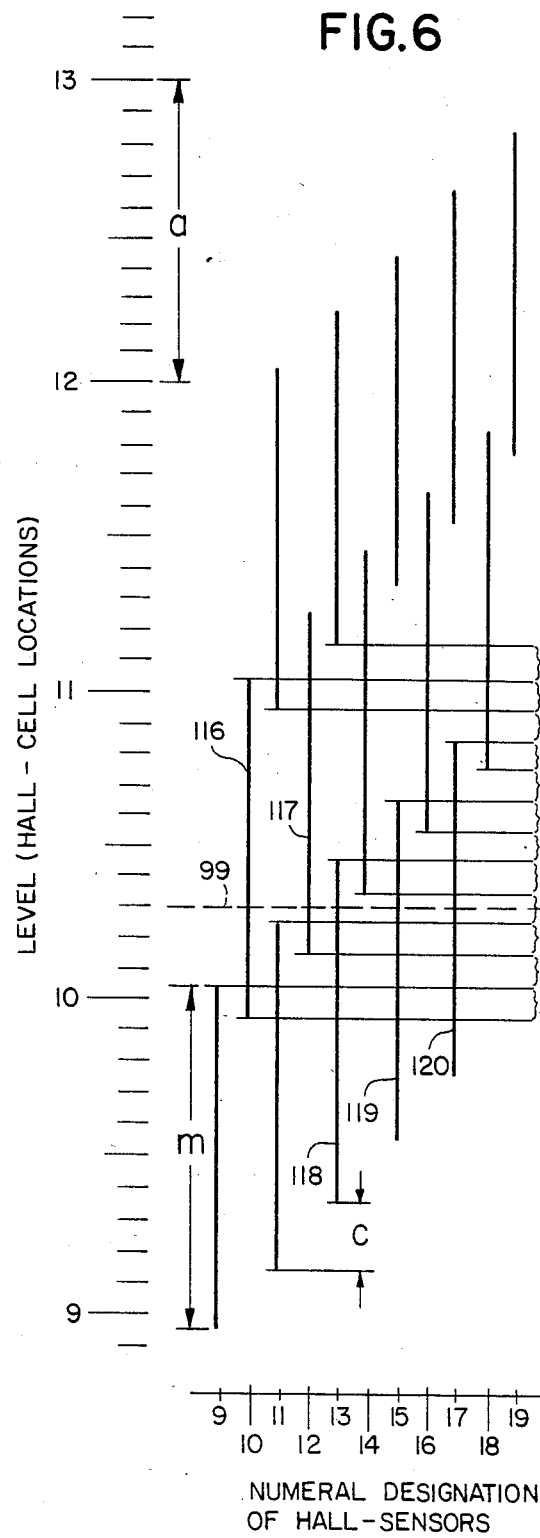
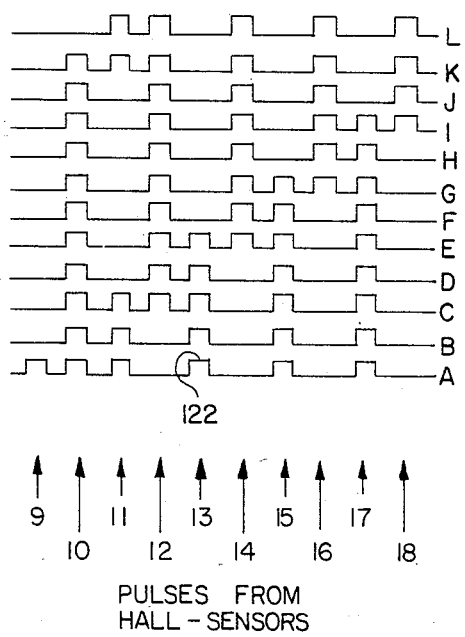

FINE RESOLUTION LIQUID LEVEL DETECTOR

CROSS REFERENCE TO RELATED APPLICATION

This application is a continuation-in-part of application Ser. No. 363,183, filed Mar. 29, 1982 now U.S. Pat. No. 4,466,284.

BACKGROUND OF THE INVENTION

This invention relates to liquid level detectors of the type having a column of sensors capable of being operated by a signal or field from an adjacent floating signal or field generator, and more particularly pertains to such a level detector having a resolution that is smaller than the spacing of the sensors.

One prior art liquid level gauge is comprised of a string of series connected magnetic field actuated reed relays. A resistor is connected across each relay. The relay string and resistors are mounted in a protective tube which is mounted vertically in the tank. A magnet is mounted to an annular float that is adapted to be slidably movable about the tube in a vertical direction. The total resistance of the string is taken as a measure of the liquid level. This total resistance is inversely proportional to the number of reed relays whose contacts are closed and provides an analog measure of the liquid level. Such level detectors are especially insensitive to small level changes when the tank is from about half full to full of liquid.

A level detector of improved accuracy is described by Nagy in his U.S. Pat. No. 4,361,835 issued Nov. 30, 1982, and assigned to the same assignee as is the present invention. That detector employs a vertical column of Hall-cells and associated Schmitt trigger circuits that are scanned by turning on one Hall-Schmitt switch at a time in sequence. Their outputs are connected together to an output line. A floating magnet thus causes an adjacent Hall-cell and associated switch to produce a signal on the output line a number of scan time intervals later than the start of a scan cycle. This number of scan time intervals corresponds to the position in the column of that magnet-actuated Hall-sensor and can be very easily converted into a binary or other code that is suitable for data storage or display. This measure of liquid level has a characteristic resolution that is equal to the spacing of the Hall-cells in the column, at every liquid level. To obtain a smaller resolution requires the use of a greater number of Hall-cells and associated circuitry that entails a proportional increase in cost.

It is an object of the present invention to provide a multiple Hall-cell type liquid level detector that has a substantially smaller resolution than the spacing of the Hall-cells and thus relatively lower cost for a detector of a given resolution.

SUMMARY OF THE INVENTION

A fine resolution liquid level detector has a column of essentailly identical Hall-sensors. Each Hall-sensor is capable of producing at a sensor output one type of electrical signal (e.g. a low voltage) when the sensor is in a magnetic field of one polarity, e.g. (south going field). On the otherhand the Hall-sensor is capable of producing at the output another type signal (e.g. a high voltage) when the sensor is in another polarity of magnetic field (e.g. a north going field or no field at all).

When means is provided for holding the Hall-sensors column in a liquid (e.g. gasoline), there is provided a float that will carry a compound magnet at the surface of the liquid. The magnet is guided and essentially kept at a fixed distance from the column. It will thus travel along the column bringing different groups of Hall-sensors under the influence of its compound magnetic field.

The profile of that field taken along the axis of the Hall-sensor column, is comprised of a group of essentially equally long equally spaced magnetic field regions of the above-noted one kind or polarity (e.g. south going), There are just n of these one polarity regions each having a length or span m, and they have a center-to-center spacing b that is not equal to the spacing a of the Hall-sensors. The span b is larger than a. They have a vernier relationship according to $$b = \left(2 - \frac{1}{n}\right) a.$$

To minimize the length of the compound magnet, an optimum design center requires that the field region lengths $$m = \left(1 + \frac{1}{2n}\right) a.$$

The preferred method of operation comprises sequentially, and one at a time, scanning to energize the Hall-sensors, e.g. in an upward direction. The first magnet switches at least one or two Hall-sensors. The first Hall-sensor output to become a one-type signal, will always be in response to the influence of the first (e.g. bottom) magnet. The number of Hall-sensors scanned may be counted from the beginning end of the column, e.g. the bottom end, to the first sensor switched, to determine the number of Hall-sensor spacings that represents the rough level of the liquid. Vernier information is generated by the signals produced by the Hall-sensors under the influence of the other magnets. This information is in binary form and is decoded or translated into vernier distances that are added to the above-mentioned rough level data to measure the liquid level with enhanced resolution. That resolution may be many times smaller than the spacing of the Hall-sensors in the column.

Thus there is provided a liquid level sensor having fewer Hall-sensors for a given resolution or having finer resolution for a given number of Hall-sensors, that for all cases results in a favorably small cost-resolution product.

BRIEF DESCRIPTION OF THE DRAWINGS

FIG. 6 shows a bar diagram having an ordinate marked off in units of Hall-sensors spacing and an abscissa along which are marked the numeral designation of said adjacent Hall-sensors referred to above in FIG. 5.

FIG. 7 shows electrical waveforms that appear on the output data line (115) in the detector of FIG. 1 for various liquid levels, which waveforms contain coded vernier distances information.

FIG. 8 is a chart showing the binary codes associated with the waveforms, respectively on FIG. 7 and the associated liquid level given in units of the spacing between the Hall-sensors.

DESCRIPTION OF THE PREFERRED EMBODIMENTS

Figure 1:
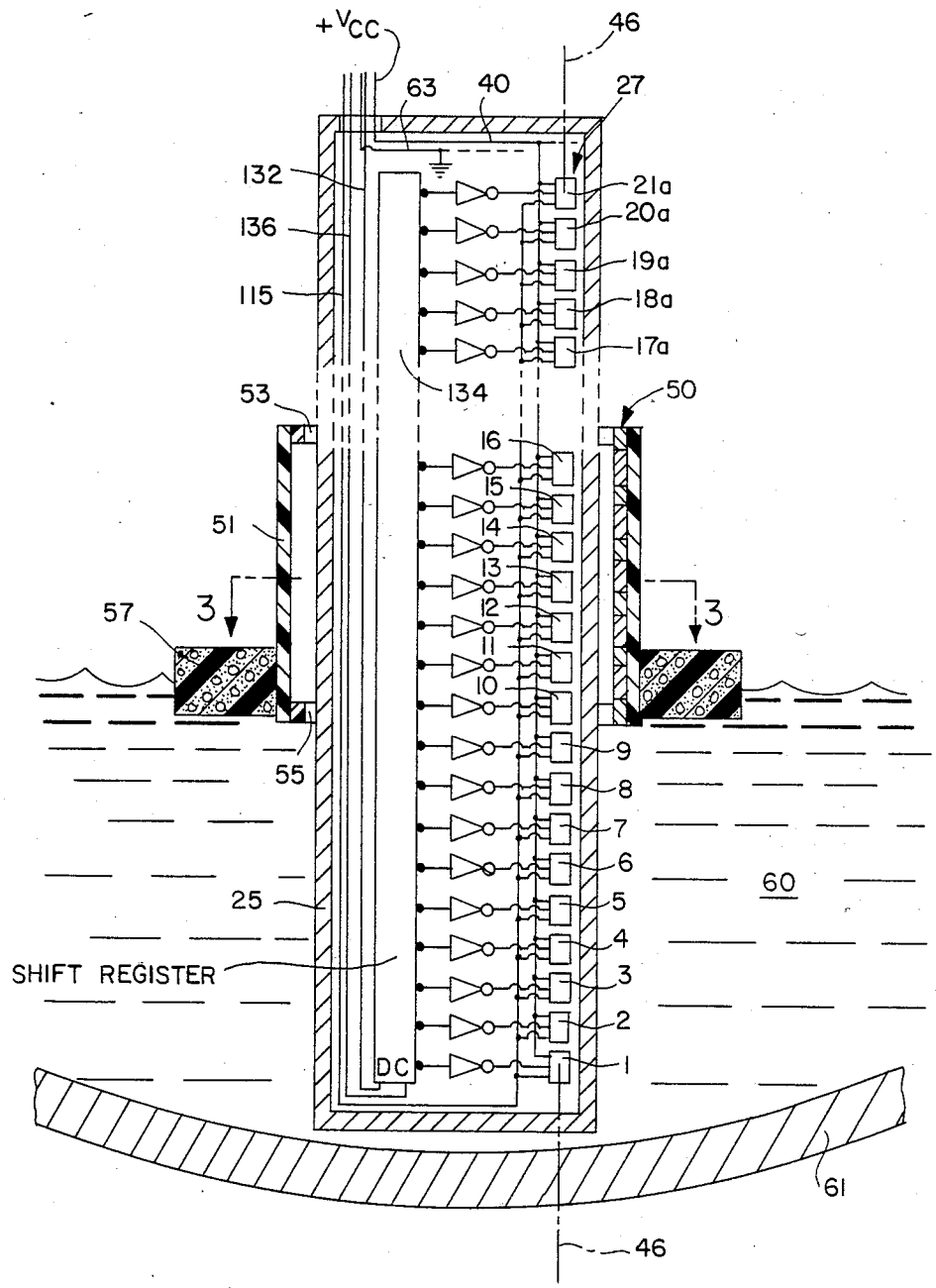
FIG. 1 shows a side sectional view of a liquid level detector of this invention.
Figure 2:
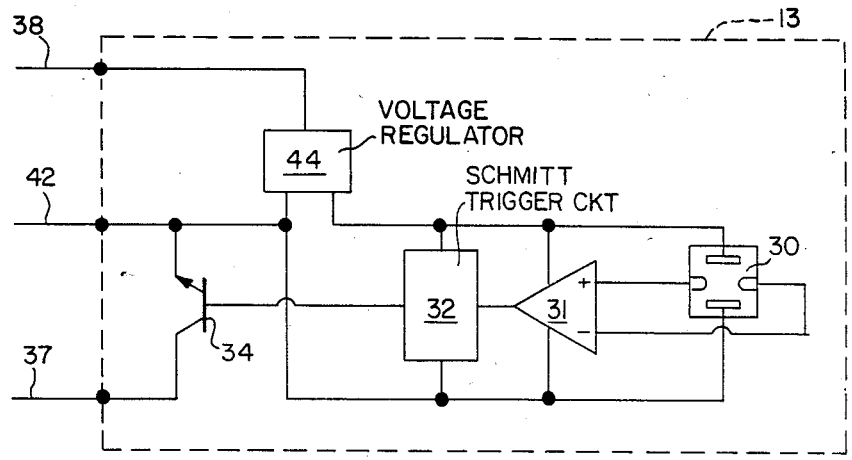
FIG. 2 shows a diagram of Hall-sensor of which many such are included in the detector of FIG. 1.
Figure 3:
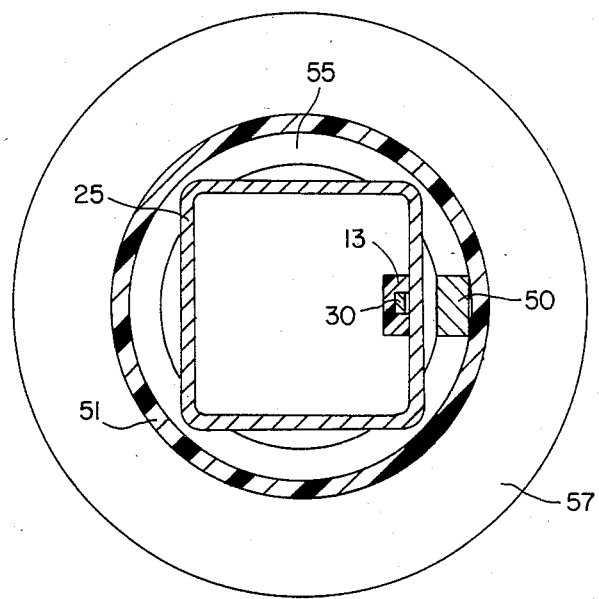
FIG. 3 shows a sectional view taken in plane 3—3 of the liquid level detector of FIG. 1.

The liquid level detector of FIGS. 1 and 3 has a protective stainless steel tube 25 that has a closed bottom end. Inside the tube 25 is mounted a column 27 of Hall-sensors 1 through 21a. As illustrated in FIG. 2, each of the sensors, e.g. 13, is an integrated circuit including a Hall-cell 30, a Hall-cell amplifier 31 and a Schmitt trigger circuit 32. Such an integrated circuit Hall-sensor 13 as is diagramed in FIG. 2 is described by R. Genesi in U.S. Pat. No. 3,816,766 issued June 11, 1974, that is assigned to the same assignee as is the present invention. Thus when the magnetic field ambient to a Hall-cell 30 exceeds a predetermined strength, transistor 34 turns on. The Hall-sensor output voltage, appearing at the bottom lead wire 37 with respect to the middle lead wire 42, will then drop to zero from a positive value. Power is supplied to the Hall-sensors, e.g. 13, by connecting as seen in FIG. 1 via buss 40 a d.c. power supply (not shown, of +Vcc volts) between sensor lead wires 38 and 42 which energizes the on-board voltage regulator 44.

The essentially identical Hall-sensors, e.g. 13, are all uniformly spaced from one another. To provide a practical example, we will assume that the center to center spacing of the Hall-sensors is 0.200 inch and that the Hall cells, e.g. 30, are adjacent to and outwardly facing so as to be most sensitive to magnetic lines of force that are normal to the wall of the tube 25. The Hall-cells, e.g. 30, in column 27 have a common vertical axis 46 and of course are themselves located every 0.20 inches along axis 46.

A compound magnet assembly 50 is mounted inside a tube 51. The tube 51 is larger than and slides over tube 25. The tube 25 is preferably square as shown in FIG. 3, and the tube 51 is guided to remain coaxial with tube 25 and oriented so that the magnet assembly 50 remains aligned with the Hall-sensors of column 27. This guidance is provided by two essentailly identical plastic bushings 53 and 55 mounted in the ends of tube 51, respectively. The sliding tube 51 is mounted inside a toroidal float 57 so that for each level of liquid 60, a different group of Hall-sensors (e.g. 13) are under the influence of magnet assembly 50. At the lower part of FIG. 1 there is shown a portion of the tank 61 containing the liquid 60.

As was the case in the above-mentioned Nagy patent application, electronics are provided to sequentially connect the supply voltage that appears across Vcc buss 40 and ground buss 63 to each of the Hall-sensors 1, 2, 3, etc. in turn. This is accomplished by permanently connecting the supply leads 38 of all sensors (e.g. 13) to Vcc buss 40, and sequentially connecting the ground buss 63 to the ground lead wires 42 of at first the sensor 1, then 2 and so on up the column 27. This cycle is continuously repeated. Only one Hall-sensor (e.g. 13) is electrically excited at any given time. This feature advantageously keeps the power consumption to a minimum. Also, a Hall-sensor 13 has a characteristic operating hysteresis wherein there can be expected some variation in both the magnetic field strength that will just switch it on as well as the field that will thereafter turn it off. In this system having a Hall-sensor scanning means, only the Hall sensor turn-on field strength is of significance because the power (Vcc) to each Hall-sensor is periodically removed. Thus in the manufacture of the Hall-sensor 13, techniques for control of the turn-on field strength can advantageously ignore the turn-off field strength.

Figures 4, 5:
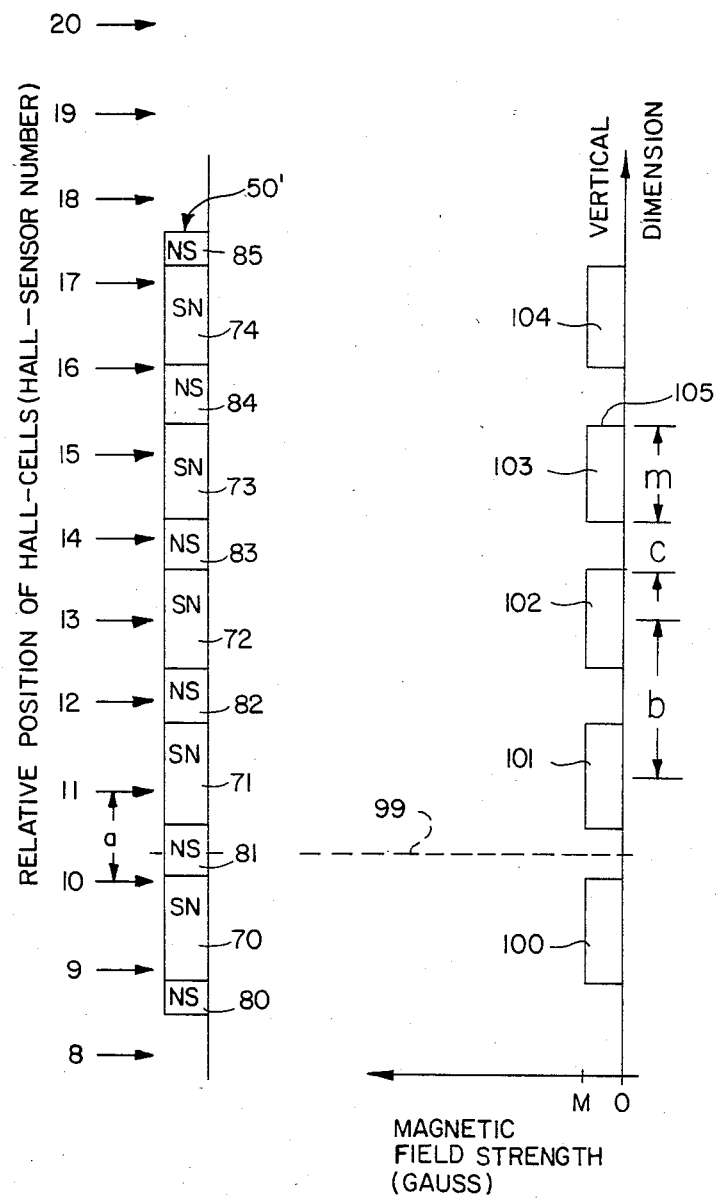
FIG. 4 shows in side view the profile of the south magnetic field regions produced by the floating compound magnet represented in FIG. 5.
FIG. 5 shows in side view the compound magnet that produces the magnetic field regions profile of FIG. 4 and also shows relative positions and vertical spacings of the adjacent Hall-sensors.

The compound magnet assembly 50 produces at the Hall-sensor column 27 an alternating pattern of south magnetic field regions as a function of vertical distance as is indicated in FIG. 4. Only the "south" magnetic field is represented there since only a south field region turns on the particular Hall-sensors (13) used in this embodiment when they face outwardly, namely integrated circuit type UGN 3019T made by Sprague Electric Company, Worcester, Mass.

With reference to FIG. 5, the discrete magnets 70, 71, 72, 73 and 74 are all oriented to produce a south field at their left side (as shown). These are considered to be the principal magnets of an alternate magnet assembly 50' to the assembly 50 of FIG. 1 because they are intended to turn on Hall-sensors 13. The discrete magnets 80, 81, 82, 83, 84 and 85 produce a north field at their left faces serving to shape the principal south magnetic field regions 100 to 104 so that the top and bottom field region perimeters are as nearly straight and horizontal as possible to maintain a high accuracy of the vernier measure in spite of small variations in the lateral separation between the magnets 100–104 and the Hall-cells 30. The south field profile shown in FIG. 4 and the individual magnets 70–74 and 80–85 in FIG. 5 are essentailly drawn to the same vertical scale and are registered with respect to each other. The magnets 70, 71, 72, 73 and 74 are all of the same size and have a vertical span m that is related to the spacing a of the Hall-sensors by $$m = \left(1 + \frac{1}{2n}\right) a.$$

Thus when as in our example, n=5 then m=1.1a.

The magnets 81, 82, 83 and 84 are all of the same size and have a vertical span c of just $$\left(1 - \frac{3}{2n}\right) a$$

or 7/11 times that of the dimension m. Both groups of magnets are made of the same samarium-cobalt material and have the same strength per unit vertical length (height as shown).

To the side view of the magnet assembly 50' in FIG. 5 are also indicated the relative positions of the Hall-cells (30), corresponding to the Hall-sensors 8 through 20, substantially as they appear in FIG. 1. Note that the vertical interval, a, between the Hall-sensors and thus the interval between the Hall-cells is significantly smaller than the center to center vertical distances, b, between the adjacent magnets that produce the south field regions 100, 101, 102, 103, 104.

In FIG. 4, each south field profile is shown with a uniformly constant magnitude, M. In fact, these field regions exhibit an undulating magnitude, but always exceeding the value M at the Hall-sensor column 27 that insures the switching of a horizontally aligned Hall-sensor (e.g. 13). In this level detector, the separation between the face of the magnet 50 and the Hall-sensor package is about 0.06 inches (1.5 mm) and at this separation the profile of FIG. 4 is an accurate representation of the effective field, including remarkably straight and horizontal peripheral boundaries, e.g. 105. The reference line 99 in FIG. 4 corresponds very nearly in this embodiment to the liquid level that is established in FIG. 1.

The diagram of FIG. 6 is to present a clearer view of the means by which the level detector of this invention provides a vernier or interpolated measure of liquid level between the adjacent of the Hall-sensors.

For each liquid level, there is a corresponding horizontal line in FIG. 6. For example, the horizontal dotted line 99 is three tenths of an interval "a" higher than the Hall-cell of sensor 10. This is consistent with the particular level of liquid indicated in FIGS. 1 and 4.

Each bar in the diagram of FIG. 6 has a length that is equal to the vertical extent of one of the south magnetic field regions 100–104. For the particular liquid level illustrated, one can surmise from FIG. 1, and definitely determine from FIG. 4 combined with FIG. 5 or from FIG. 6 alone, that the Hall-sensors 10 and 11 are turned on by south field regions 100 and 101, respectively. It can further be seen that at this level, no other Hall-sensors are turned on. These facts are apparent from a mere glance at the diagram of FIG. 6 since the level line 99 is intercepted only by the bars 116, 117, 118, 119 and 120. The long bar 116 represents the field region 100 while the bar 117 represents the field region 101. The 116 is in the vertical line of Hall-sensor 10 (in the diagram of FIG. 6). The bar 117 is in the vertical line of Hall-sensor 12 etc.

The waveforms of FIG. 7 represent the various composite time voltage signals appearing on the data output line 115 for various levels. Each upward excursion or pulse, e.g. 122, of a waveform, e.g. A, (with time increasing as is conventional from left to right) is the one produced by the first magnetic field region 100. At the liquid level corresponding to dotted line 99 in FIG. 6, the waveform D appears. It appears each time on the output data line 115 that a scan is made. Thus the digital code is 10110101 as noted in the associated chart of FIG. 8. Also from FIG. 8, that vernier indication of level is 0.3 the interval "a", and it is added to the "rough" level corresponding to the level of the tenth Hall-sensor 10. The 10.3 is therefore the decimal measure of liquid level in units of "a" (Hall-cell spacing).

Returning to FIG. 6, the resolution, r, of the system corresponds to the smallest increment of liquid level that is distinguished by the system. The resolution r is r=a/2n In this instance for n=5 this resolution increment, r, is 0.1a, as can also be seen from the chart of FIG. 8. Since the Hall-sensor spacing, a, is in this case 0.2 inches then the resolution is 0.02 inches (0.51 mm).

Figure 9:
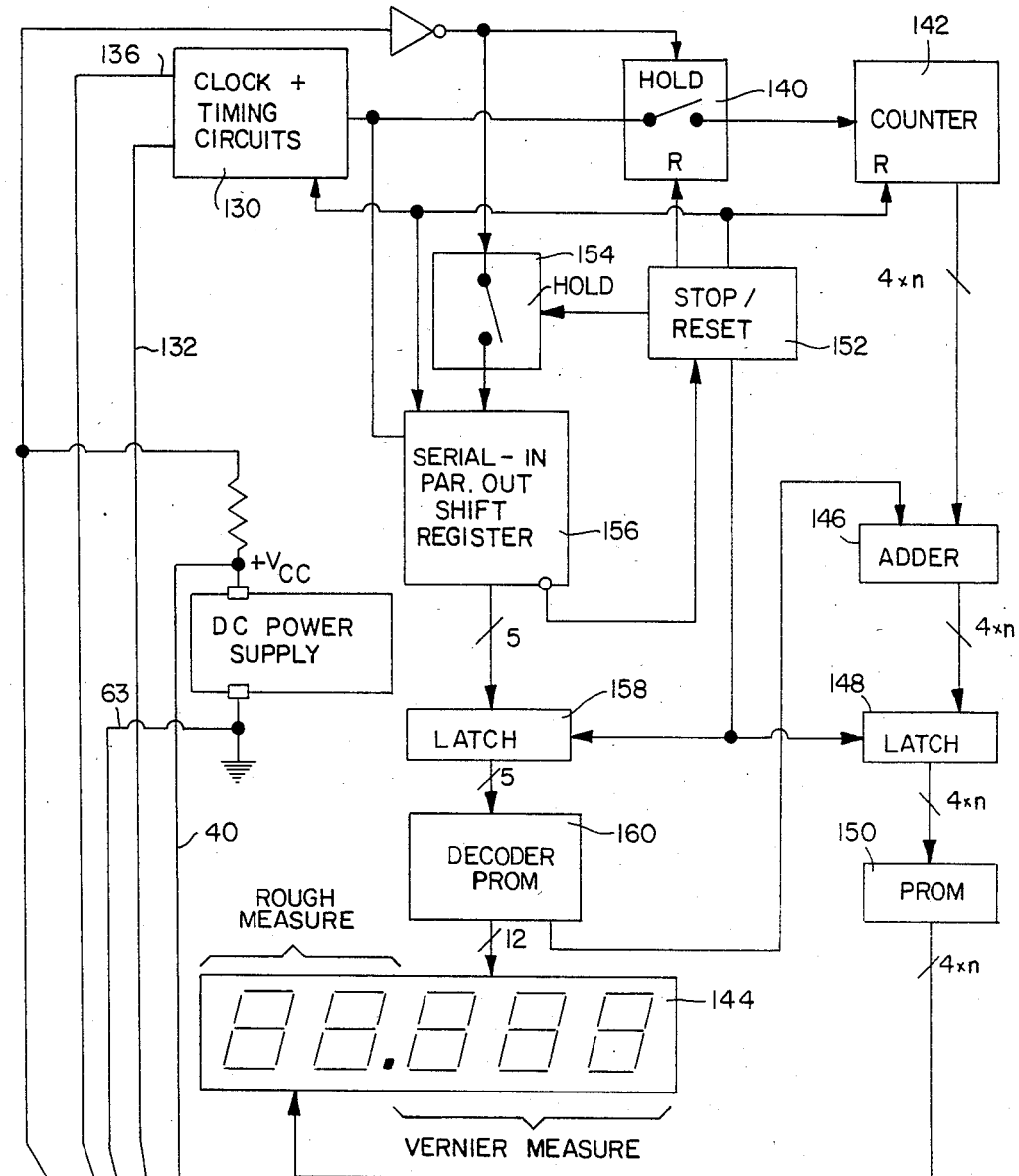
FIG. 9 shows a block diagram of the electronics that may be used to activate and display the liquid levels data from the level detector of FIG. 1.

A typical scanning cycle is briefly described with reference to the electric block diagram of FIG. 9 and the level detector of FIG. 1.

A data bit generated by the timing circuits 130 is inserted via line 132 into the bottom-most bit of shift register 134. Clock pulses sent from clock circuit 130 via line 136 then shift the one bit sequentially up the shift register 134 activating Hall-sensors 1–21a one at a time. When the first Hall-sensor under the influence of the first magnetic field (100) is reached, the first occurring data bit appears in the Hall-sensor output line 115 and the hold switch 140 is turned off to stop the count of clock pulse by counter 142. The counter output is then displayed in the first two digits of display 144 after passing through adder 146, latch 148, and PROM 150.

As the scanning continues, a pattern of sensor output pulses is generated in the data line 115. The stop/reset circuit 152 closes the hold switch 154 admitting this vernier data to the serial-in parallel-out shift register 156 which is sent through latch 158 for decoding at PROM 160 and then to display 144.

In a comparison of the level detector described herein and a well known mechanical vernier gauge, it will be noted that the column of equally spaced Hall-sensors corresponds to the regular scale of the gauge and the vernier magnets, and vernier field regions, correspond to the vernier scale of the gauge.

What is claimed is:

1. A fine resolutrion liquid level detector comprising:
   (a) a column of uniformly spaced Hall-sensors, each of said Hall-sensors being capable of producing at an output thereof one type of electrical signal when in a magnetic field of one polarity and being capable of producing at said output another type electrical signal when in another polarity of magnetic field;
   (b) a compound megnet assembly for producing at said column a fixed pattern of spaced apart magnetic field regions of said one polarity, there being only a number n of said regions, each of said regions having a uniform center to center spacing b as measured along the axis of said column, b being greater than a and $$b = \left(2 - \frac{1}{n}\right) a$$

wherein a is said uniform spacing of said Hall-sensors;
   (c) means for holding said column vertically in a liquid;
   (d) means for guiding said compound magnet assembly along and at a substantially fixed distance from said Hall-sensors column; and
   (e) means for keeping said compound magnet assembly at the surface of said liquid.

2. The liquid level detector of claim 1 wherein the span m of each of said field regions measured along said column axis is related to said number of field regions n by $$m = \left(1 + \frac{1}{2n}\right) a.$$

* * * * *